US012286331B2

(12) United States Patent
Tanimoto et al.

(10) Patent No.: US 12,286,331 B2
(45) Date of Patent: Apr. 29, 2025

(54) CRANE

(71) Applicant: SUMITOMO HEAVY INDUSTRIES CONSTRUCTION CRANES CO., LTD., Tokyo (JP)

(72) Inventors: Shingo Tanimoto, Aichi (JP); Jacinda Ng, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 1273 days.

(21) Appl. No.: 17/012,790

(22) Filed: Sep. 4, 2020

(65) Prior Publication Data
US 2020/0399099 A1 Dec. 24, 2020

Related U.S. Application Data

(63) Continuation of application No. PCT/JP2018/008661, filed on Mar. 6, 2018.

(51) Int. Cl.
*E06C 5/24* (2006.01)
*B60R 3/00* (2006.01)
(Continued)

(52) U.S. Cl.
CPC .............. *B66C 23/62* (2013.01); *B60R 3/005* (2013.01); *B60R 3/007* (2013.01); *B62D 55/06* (2013.01);
(Continued)

(58) Field of Classification Search
CPC ... B60R 3/005; E06C 1/36; E06C 5/02; E06C 5/24; B63B 27/14; B63B 27/146; E01D 15/24; B65G 69/28
See application file for complete search history.

(56) References Cited

U.S. PATENT DOCUMENTS 3,554,320 A * 1/1971 Eggert, Jr. ................ B64F 1/31
182/98
4,243,120 A * 1/1981 Pratt, Jr. ................... E06C 5/02
182/98
(Continued)

FOREIGN PATENT DOCUMENTS

JP S49-099782 Y 12/1972
JP H07-189294 A 7/1995
(Continued)

OTHER PUBLICATIONS

International Search Report issued in Application No. PCT/JP2018/008661, mailed Apr. 17, 2018.

Primary Examiner — Colleen M Chavchavadze
(74) Attorney, Agent, or Firm — Michael Best & Friedrich LLP

(57) ABSTRACT

A crane includes a lower traveling body, an upper turning body that is turnably provided on the lower traveling body, a counterweight that is mounted on the upper turning body, and a ladder for getting on and off the upper turning body. The ladder has an engagement member that is able to be engaged with and disengaged from an engaged portion provided at the upper turning body, a support portion that supports the engagement member, and a following mechanism that is interposed between the engagement member and the support portion. When the engaged portion in a state of being engaged with the engagement member is moved downward with work of mounting the counterweight, the following mechanism causes the engagement member to follow downward movement of the engaged portion.

15 Claims, 7 Drawing Sheets

(51) Int. Cl.
    *B62D 55/06*       (2006.01)
    *B66C 13/00*       (2006.01)
    *B66C 23/62*       (2006.01)
    *B66C 23/74*       (2006.01)
    *E06C 5/02*        (2006.01)
    *E06C 7/48*        (2006.01)

(52) U.S. Cl.
    CPC .............. *B66C 13/00* (2013.01); *B66C 23/74* (2013.01); *E06C 5/02* (2013.01); *E06C 5/24* (2013.01); *E06C 7/48* (2013.01)

(56) References Cited

U.S. PATENT DOCUMENTS

| | | | | |
|---|---|---|---|---|
| 4,936,611 | A * | 6/1990 | Palvolgyi | E05B 83/16 292/216 |
| 5,054,581 | A * | 10/1991 | Henson | E06C 7/48 248/210 |
| 5,339,919 | A * | 8/1994 | Boyd | B60R 3/02 182/98 |
| 5,992,564 | A * | 11/1999 | Kirkpatrick | E04G 5/10 182/117 |
| 6,003,633 | A * | 12/1999 | Rolson | E06C 5/02 182/127 |
| 6,044,930 | A * | 4/2000 | Hayman | E06C 1/34 182/206 |
| 7,354,066 | B2 * | 4/2008 | Yamamoto | B62D 49/085 280/760 |
| 7,516,997 | B2 * | 4/2009 | Kuznarik | B62D 33/0273 182/127 |
| 7,658,293 | B2 * | 2/2010 | Yamamoto | B66C 23/74 212/178 |
| 8,074,768 | B2 * | 12/2011 | Rund | E06C 5/04 182/86 |
| 8,113,315 | B2 * | 2/2012 | Farley | E06C 5/20 182/86 |
| 8,397,869 | B2 * | 3/2013 | Tsutsumi | E02F 9/0833 182/127 |
| 8,640,826 | B1 * | 2/2014 | Beilstein | E06C 7/182 182/127 |
| 8,881,867 | B2 * | 11/2014 | Takenawa | E02F 9/2271 182/127 |
| 9,222,306 | B2 * | 12/2015 | Appling | B66C 13/52 |
| 9,382,759 | B2 * | 7/2016 | Bolinski | E06C 7/188 |
| 9,404,306 | B2 * | 8/2016 | Russell | E06C 7/188 |
| 9,593,531 | B2 * | 3/2017 | Ballard | E06C 7/48 |
| 9,702,114 | B2 * | 7/2017 | Larson | E02F 9/18 |
| 9,815,529 | B2 * | 11/2017 | Perkins | E04H 4/144 |
| 9,816,318 | B2 * | 11/2017 | Johnson | E06C 5/04 |
| 10,005,397 | B2 * | 6/2018 | Uemura | E02F 9/16 |
| 10,093,238 | B2 * | 10/2018 | Koga | E02F 9/0833 |
| 2009/0145692 | A1 * | 6/2009 | Flickinger | A01D 41/1261 182/127 |
| 2014/0332488 | A1 | 11/2014 | Appling et al. | |

FOREIGN PATENT DOCUMENTS

| | | |
|---|---|---|
| JP | 2007-285055 A | 11/2007 |
| JP | 2008-254860 A | 10/2008 |
| JP | 2012-067508 A | 4/2012 |
| JP | 2015-113207 A | 6/2015 |

* cited by examiner

CRANE

RELATED APPLICATIONS

The contents of International Patent Application No. PCT/JP2018/008661, on the basis of which priority benefit is claimed in an accompanying application data sheet, is in their entirety incorporated herein by reference.

BACKGROUND

Technical Field

A certain embodiment of the present invention relates to a crane in which an upper turning body is turnably mounted on a lower traveling body, and particularly relates to a crane including a ladder for getting on and off an upper turning body on which a counterweight is mounted.

Description of Related Art

A mobile crane is provided with an upper turning body that is turnable on an upper portion of a lower traveling body. A boom is supported on a front portion side of the upper turning body such that the boom can be raised and lowered. A counterweight is mounted on a rear portion side of the upper turning body. For example, in a case where the crane passes through a bridge having a weight limit, it is necessary to transfer the counterweight to another carrier and pass therethrough in a weight reduced state, and perform work of mounting the counterweight again on the upper turning body at a work site since the counterweight is a heavy object of which a weight ranges from several tens of tons to several hundreds of tons. As described above, in a large-sized mobile crane, work of attaching and detaching the counterweight is frequently performed.

In a case of mounting the counterweight on the upper turning body, a worker aligns the counterweight placed on the ground with an attaching portion of the upper turning body, then gets on a workbench provided on the upper turning body, and performs work such as operation of a counterweight raising and lowering device, alignment of the counterweight, and attachment of a fixing pin. In this case, since the workbench provided on the upper turning body is at a considerably higher position than the ground, a ladder is laid between the ground and the workbench and the worker gets on and off the workbench using the ladder.

As the related art for using a ladder mounted on a vehicle body and getting on and off an upper turning body, there is known a construction machine (hydraulic excavator) that enables raising and lowering to an upper surface portion of the upper turning body using a ladder. Such a ladder which is stored in a lower surface portion of the counterweight is rotated in a horizontal direction to be put out and stand at the rear and is brought into a using state by hooking an upper end portion thereof to an engaged portion provided at the counterweight.

SUMMARY

According to an embodiment of the present invention, there is provided a crane including a lower traveling body, an upper turning body that is turnably provided on the lower traveling body, a counterweight that is mounted on the upper turning body, and a ladder for getting on and off the upper turning body. The ladder has an engagement member that is able to be engaged with and disengaged from an engaged portion provided at the upper turning body, a support portion that supports the engagement member, and a following mechanism that is interposed between the engagement member and the support portion. When the engaged portion in a state of being engaged with the engagement member is moved downward with work of mounting the counterweight, the following mechanism rotates the engagement member with respect to the support portion such that the engagement member follows downward movement of the engaged portion.

DETAILED DESCRIPTION

As described above, in a case where the counterweight is mounted on the upper turning body of the crane, it is necessary to first lay the ladder between the ground and the workbench. In this case, in general, a hook-shaped engagement member of which a lower surface side is open is fixed to an upper portion of the ladder, and the engagement member is hooked to the engaged portion of a beam (horizontal pipe) provided at the workbench. After the worker uses the ladder to get on the workbench in this state, the worker operates the raising and lowering device on the workbench to raise the counterweight on the ground, and aligns the counterweight with a predetermined place in the upper turning body so as to be attached with the fixing pin.

However, in a case of raising the counterweight placed on the ground in work of mounting such a counterweight, when the load of the counterweight, which is a heavy object, is applied to the upper turning body, the upper turning body sinks downward due to the weight. Therefore, there is a possibility that the engagement member of the ladder is lifted and comes off from the engaged portion of the workbench. By firmly connecting the engagement member of the ladder and the engaged portion to each other with the use of fixing means such as a screw, an engagement state between the engagement member and the engaged portion can be maintained even when the upper turning body sinks. However, in this case, since an excessive bending load acts on an engaging place between the engagement member and the engaged portion with the sinking of the upper turning body, the engagement member is easily damaged.

It is desirable to provide a crane that can perform work of mounting a counterweight in a state where a ladder is stably engaged with an upper turning body.

Figure 1:
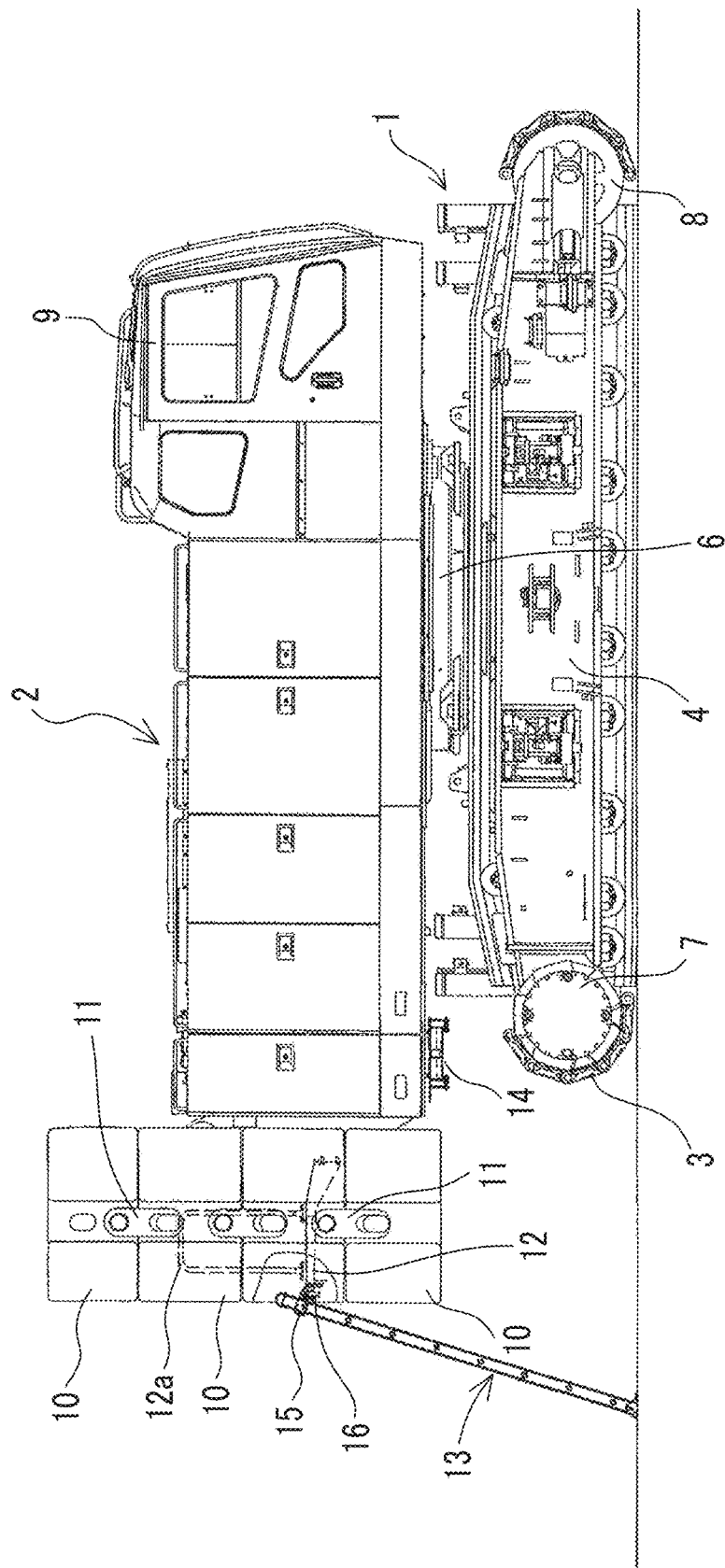
FIG. 1 is a side view illustrating main portions of a crane according to an embodiment of the invention.
Figure 2:
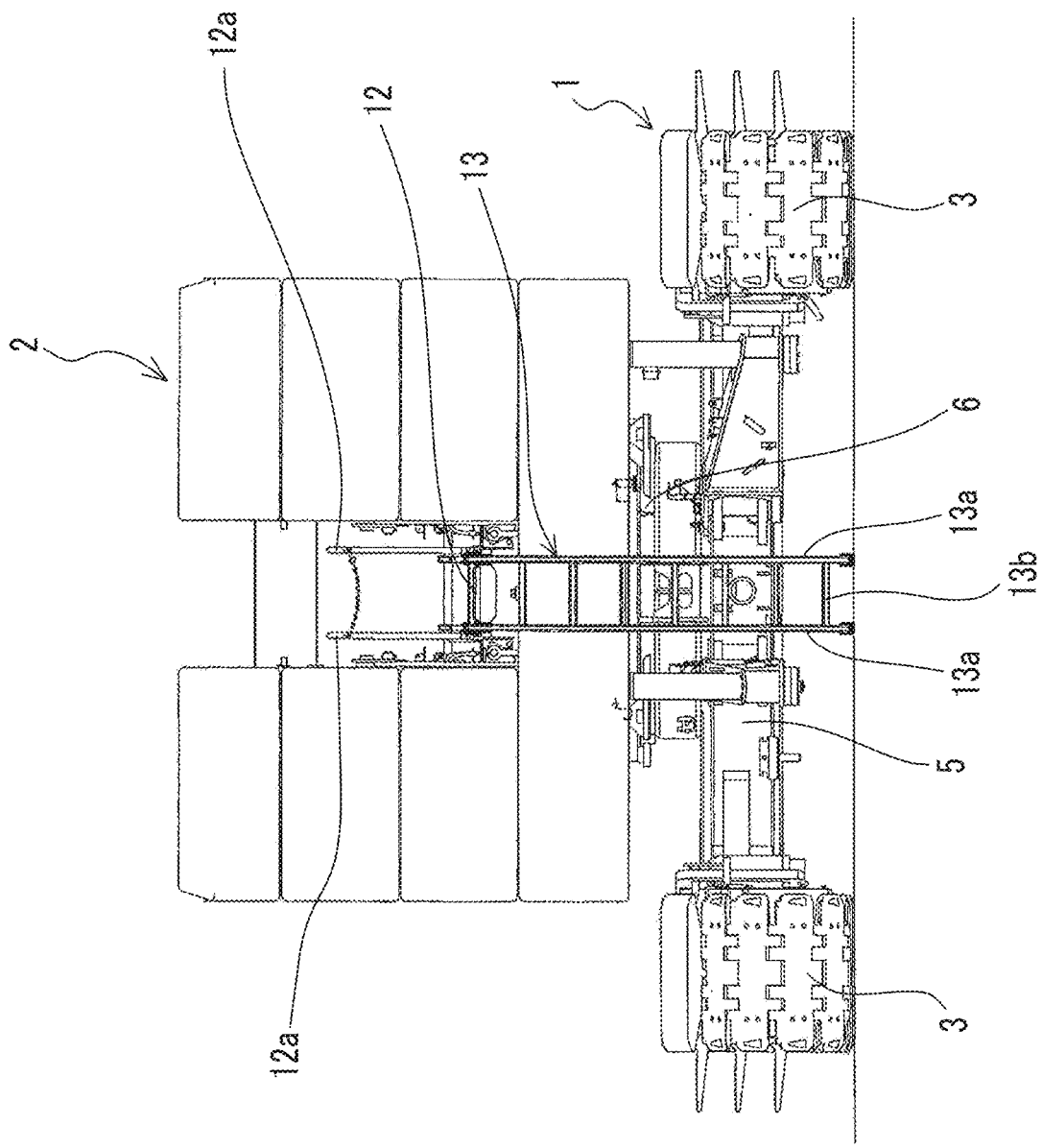
FIG. 2 is a rear view of the crane illustrated in FIG. 1.

Hereinafter, a crane according to an embodiment of the invention will be described with reference to the drawings. FIG. 1 is a side view illustrating main portions of the crane according to the embodiment, and FIG. 2 is a rear view of the crane. As illustrated in FIGS. 1 and 2, the crane is a large-sized mobile crane, and includes a lower traveling body 1 and an upper turning body 2 turnably provided on the lower traveling body 1. Although not illustrated, the upper turning body 2 supports a base end of an attachment formed of a boom or a jib for hanging up a suspended load.

The lower traveling body 1 includes a pair of right and left side frames 4 on which crawlers 3 are mounted on outer peripheries thereof and a car body 5 that connects both of the side frames 4 to each other. The upper turning body 2 is supported by the car body 5 via a turning ring 6. A traveling device 7 including a drive motor and a speed reducer is disposed on one end side of each side frame 4 in a front-and-rear direction, and an idler 8 is disposed on the other end side thereof. The crawlers 3 are mounted on outer peripheries of the traveling device 7 and the idler 8.

A cab 9 configuring a driver's cab is provided on a front portion side of the upper turning body 2, and a plurality of counterweights 10 are mounted on a rear portion side of the upper turning body 2. Each counterweight 10 is fixed to a rear end portion of the upper turning body 2 by a pin (not illustrated) in a state of being connected to each other in a stacked state using a connecting fitting 11. A workbench 12 positioned at a place where the counterweights 10 are attached is provided at the rear end portion of the upper turning body 2. The workbench 12 is a part on which a worker gets on when attaching and detaching the counterweights 10, and a handrail 12a for ensuring the safety of the worker is provided upright. In addition, a support rod 12b formed of a cylindrical pipe is provided on a tip end side of the workbench 12 along a right-and-left direction (horizontal direction), and the support rod 12b function as a locked portion for hanging a ladder 13 to be described later. FIG. 1 illustrates some of the counterweights 10 that are cut away in order to clarify an engagement state between the workbench 12 and the ladder 13.

Figure 3:
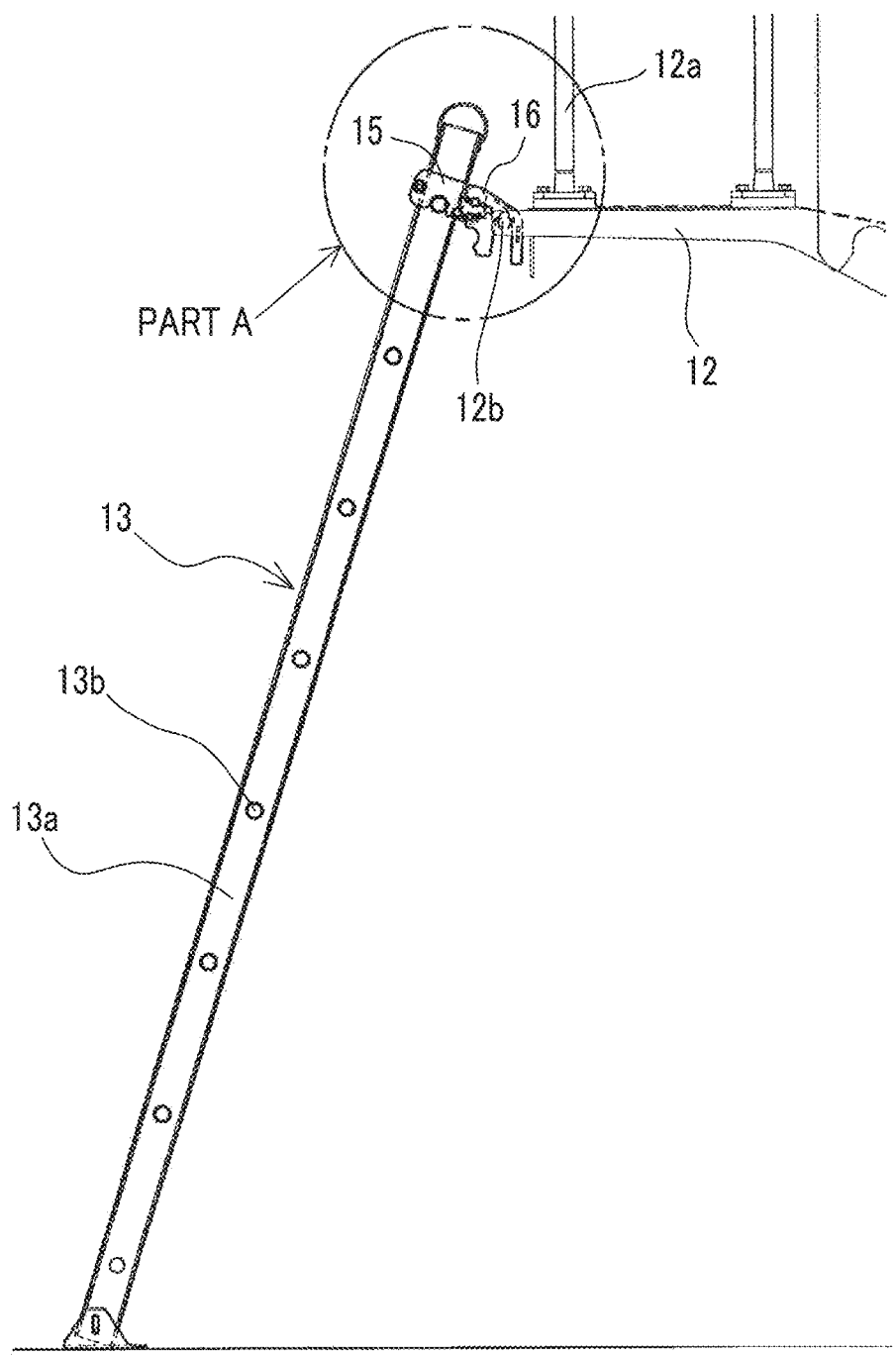
FIG. 3 is a side view illustrating a using state of a ladder included in the crane of FIG. 1.
Figure 4:
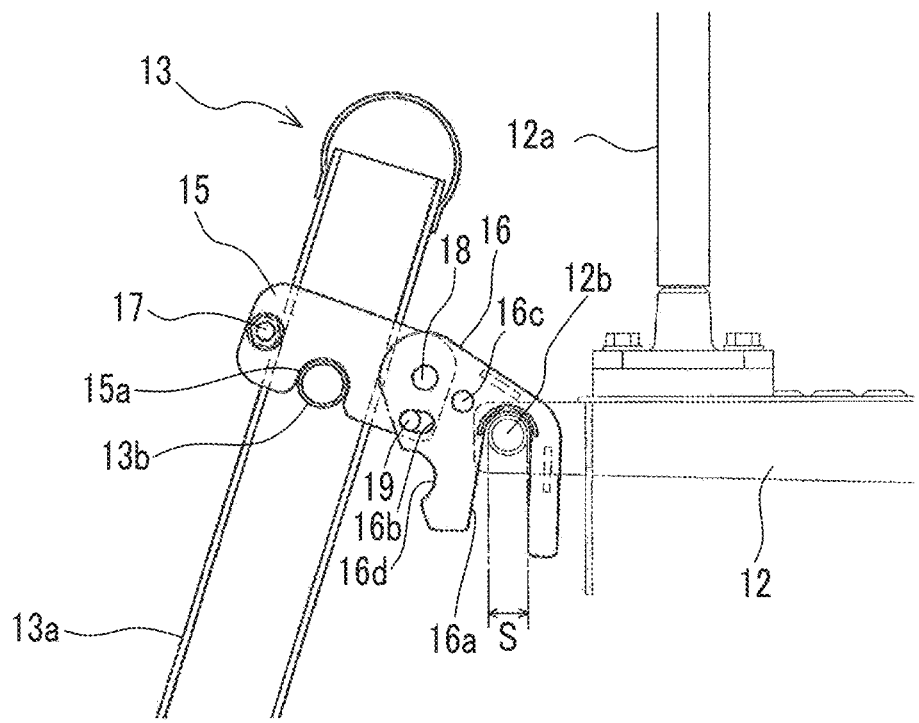
FIG. 4 is a detailed view of a part A of FIG. 3.
Figure 5:
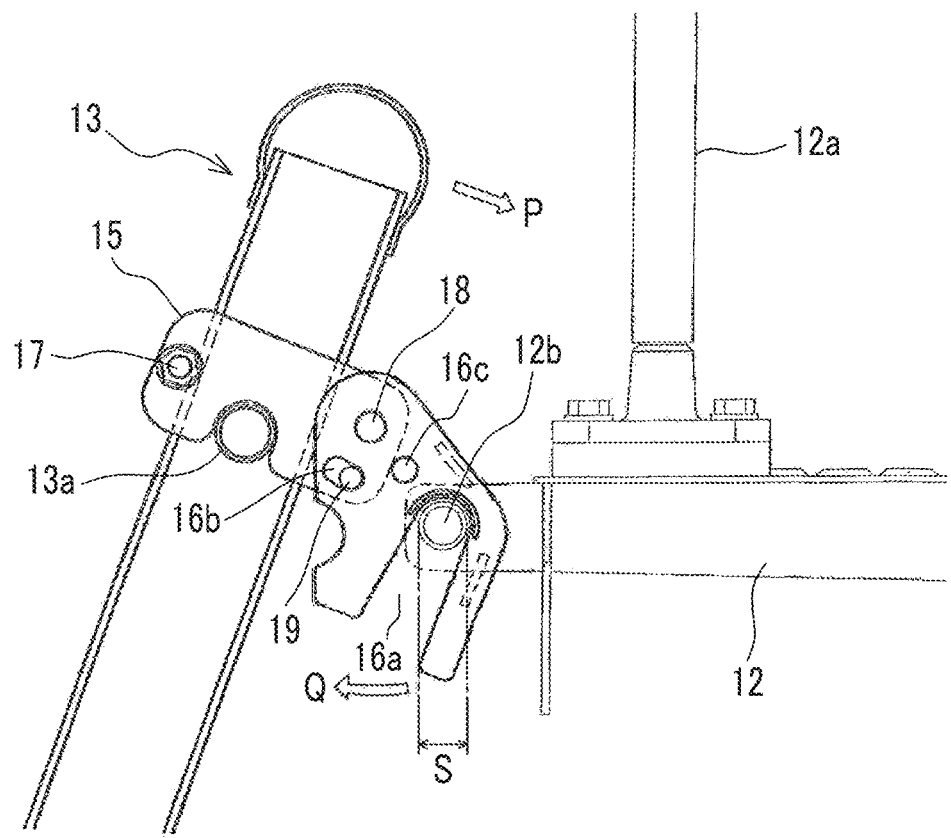
FIG. 5 is an operation explanatory view of an engagement member provided at the ladder.

The ladder 13 is used by the worker who performs work of attaching and detaching the counterweights 10 to get on and off the workbench 12. A storing bracket 14 for storing and holding the ladder 13 when not being used is provided on a bottom surface of the upper turning body 2 near the rear end portion. As illustrated in FIGS. 3 to 5, the ladder 13 includes a pair of columns 13a extending in parallel at a predetermined interval, and a plurality of steps 13b connecting both of the columns 13a to each other. Both end portions of each step 13b penetrates the columns 13a and protrudes therefrom. Both end portions of each step 13b may not penetrate the columns 13a, and both end portions of each step 13b may not protrude from the columns 13a.

Support members 15 are fixed to both of the columns 13a respectively on an upper end side of the ladder 13, and engagement members 16 are rotatably supported on the support members 15 respectively. Since a pair of the support member 15 and the engagement member 16 has the same configuration on both sides of the columns 13a, hereinafter, the support member 15 and the engagement member 16, which are attached to one column 13a, will be described.

The support member 15 is fixed to the upper end side of the column 13a using an attaching screw 17, and a semi-arc-shaped notch 15a formed in a lower end of the support member 15 is fitted to an upper end portion of the uppermost step 13b protruding from the column 13a.

The engagement member 16 is rotatably supported by the support member 15 with a support shaft 18 as a rotation fulcrum portion. An engagement groove 16a that can be engaged with and disengaged from the locked portion 12b (support rod) provided at the workbench 12 of the upper turning body 2 is provided in the engagement member 16. The engagement groove 16a is formed in an inverted U-shape, and a dimension of an open end side thereof is set to be slightly larger than a diameter of the locked portion 12b. In addition, a long hole 16b and a holding hole 16c are drilled in the engagement member 16, and the long hole 16b and the holding hole 16c are disposed on the same arc having the center at the support shaft 18. Further, a semi-arc-shaped avoiding portion 16d is formed in one side surface of the engagement member 16, and a distance from the support shaft 18 to the uppermost step 13b and a distance from the support shaft 18 to the avoiding portion 16d are set to be the same.

Figure 8:
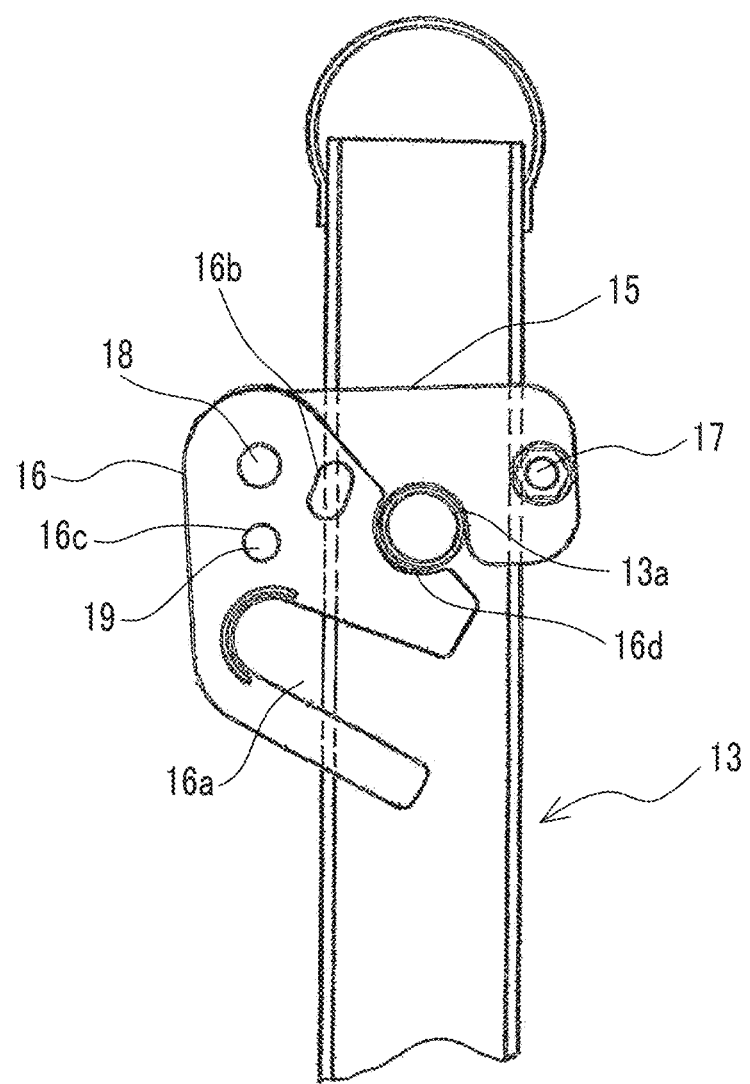
FIG. 8 is a detailed view of a part B of FIG. 7.

The support member 15 is provided with an attachable and detachable pin 19, and the pin 19 is selectively inserted into any one of the long hole 16b and the holding hole 16c of the engagement member 16. That is, while the pin 19 is inserted into the long hole 16b to be fixed to the support member 15 when the ladder 13 is used as illustrated in FIGS. 3 to 5, the pin 19 is inserted into the holding hole 16c instead of the long hole 16b to be fixed to the support member 15 when the ladder 13 is stored as will be described later. That is, pin holes (not illustrated) for fixing the pin 19 at a position corresponding to the pin 19 in the state illustrated in FIG. 4 and at a position corresponding to the pin 19 in the state illustrated in FIG. 8 are provided respectively in the support member 15.

Next, work of mounting the counterweight 10 on the rear portion side of the upper turning body 2 with the use of the ladder 13 configured as described above will be described.

The worker first connects the plurality of counterweights 10, which are placed on the ground, to each other with the connecting fitting 11, and aligns the counterweights 10 with the upper turning body 2. After then, the worker hooks the engagement groove 16a of the engagement member 16 provided at the ladder 13 to the locked portion 12b of the workbench 12, such that the ladder 13 is laid, in a forward inclined posture, between the workbench 12 provided at the upper turning body 2 and the ground, as illustrated in FIG. 3. In this case, as illustrated in FIG. 4, as the pin 19 comes into contact with one end of the long hole 16b, the rotation of the engagement member 16 is restricted in a posture in which the open end side of the engagement groove 16a faces directly downward. For this reason, the worker can easily make that the locked portion 12b is inserted in the engagement groove 16a from thereabove, and can reliably hook the engagement member 16 of the ladder 13 to the locked portion 12b on an upper turning body 2 side.

Next, after using the ladder 13 to get on the workbench 12, the worker operates a raising and lowering device (not illustrated) on the workbench 12 to raise the counterweight 10, and align the counterweight 10 to fix to the upper turning body 2 with a pin (not illustrated). In this case, when the load of the counterweight 10 raised from the ground acts on the upper turning body 2, the upper turning body 2 sinks downward due to the weight and the locked portion 12b provided at the workbench 12 of the upper turning body 2 moves downward. Therefore, an upper end of the ladder 13 falls forward with the sinking of the upper turning body 2.

Herein, in the embodiment, there is adopted a configuration where the engagement member 16 that engages with the locked portion 12b and the support member 15 that is attached to the ladder 13 are not connected to each other in a fixed manner, the engagement member 16 is supported by the support member 15 so as to be rotatable about the support shaft 18, and a following mechanism that allows the engagement member 16 to follow the sinking of the upper turning body 2 is included.

That is, as illustrated in FIG. 5, when the upper end of the ladder 13 falls forward (arrow P direction) with the sinking of the upper turning body 2, the engagement member 16 rotates in a clockwise direction (arrow Q direction) about the support shaft 18, and one of inner side walls of the engagement groove 16a facing each other enters a lower region S where the locked portion 12b is projected from above. Therefore, the engagement groove 16a is prevented from being lifted and coming off from the locked portion 12b. In addition, since the engagement member 16 rotates with respect to the support member 15, an excessive bending load is not applied to a connection place between the engagement member 16 and the support member 15, and thus the engagement member 16 and the support member 15 can be prevented from being deformed or damaged. A rotation angle of the engagement member 16 with respect to the support member 15 is restricted as the pin 19 comes into contact with both ends of the long hole 16b. A restricting part that restricts the rotation range of the engagement member 16 is configured by the pin 19 and the long hole 16b.

In addition, in the embodiment, since the support member 15 and the engagement member 16, which have the following mechanism described above, are attached to each of both of the columns 13a of the ladder 13, the following mechanisms on both of the right and left sides operate independently to cause each engagement member 16 to follow the sinking of the upper turning body 2 even in a case where a sinking amount of the upper turning body 2 is different on both of the right and left sides of the ladder 13, for example, a case where work of mounting the counterweight 10 on an inclined surface is performed.

In a case where the work of attaching and detaching the counterweight 10 is completed and the ladder 13 is to be stored on the bottom surface of the upper turning body 2, first, the worker uses the ladder 13 to get off the workbench 12 to the ground. Then, the worker raises the ladder 13 to remove the engagement groove 16a of the engagement member 16 from the locked portion 12b of the workbench 12.

Next, the pin 19 inserted in the long hole 16b is pulled out from the support member 15. As illustrated in FIG. 8, the pin 19 pulled out from the long hole 16b is inserted into the holding hole 16c and is fixed to the support member 15 after the engagement member 16 is rotated in a direction in which a protruding amount from the column 13a decreases. In this case, since the avoiding portion 16d of the engagement member 16 is fitted to the end portion of the step 13b protruding from the column 13a, the engagement member 16 is more likely to be held in a stored state where a protruding amount from the column 13a is smaller than when the engagement member 16 is engaged with the locked portion 12b.

Figure 6:
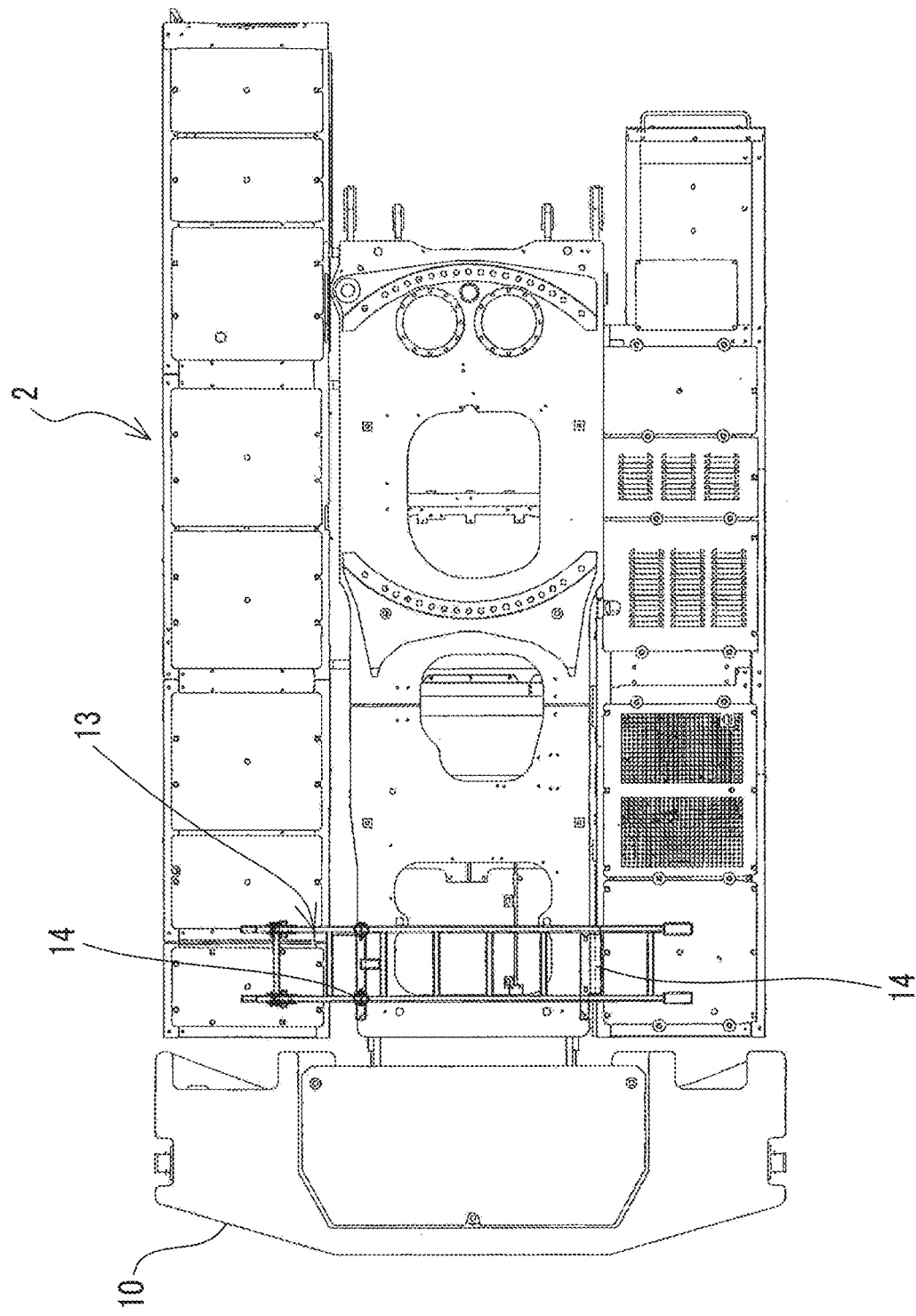
FIG. 6 is a bottom view of an upper turning body included in the crane of FIG. 1.
Figure 7:
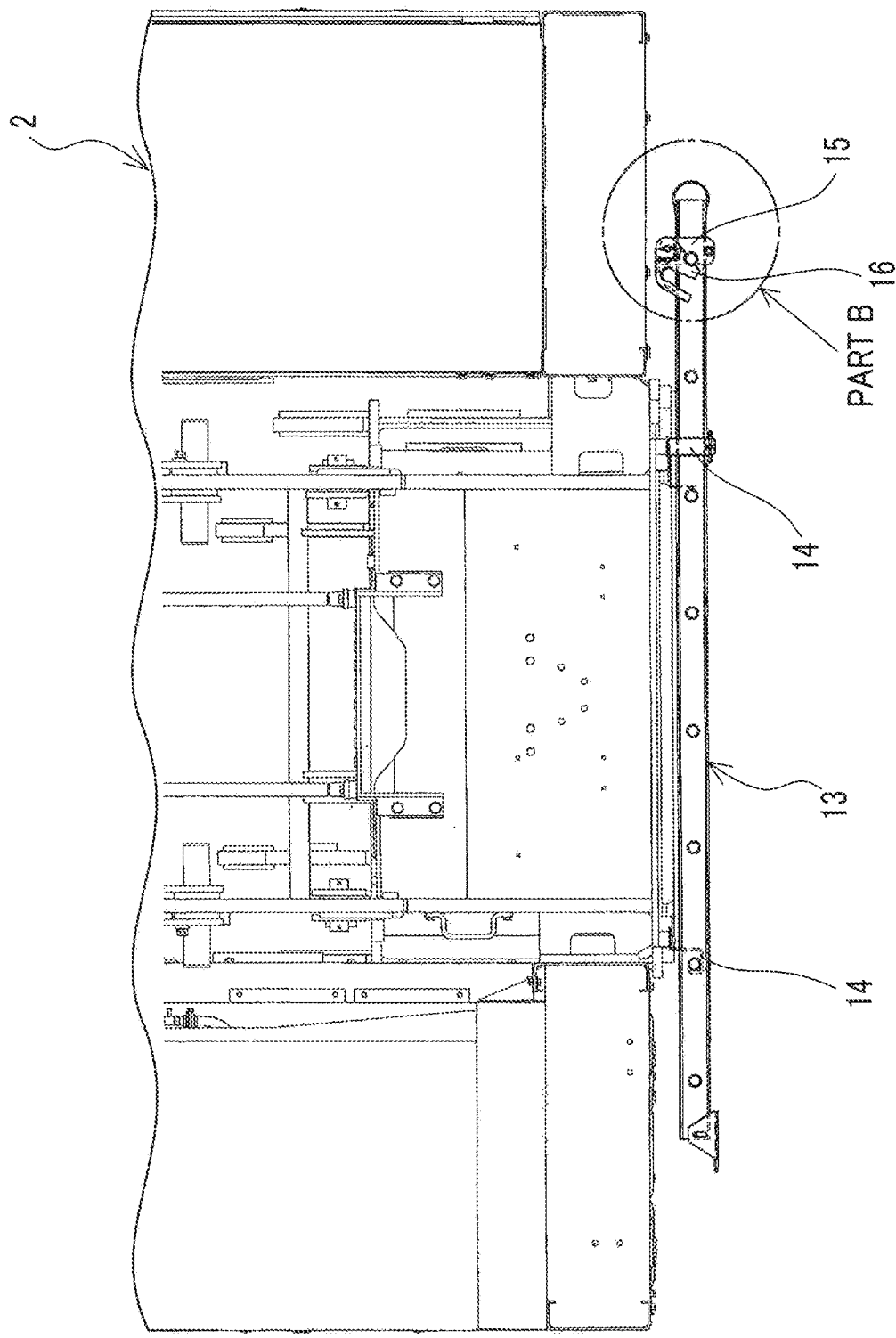
FIG. 7 is a rear view illustrating a stored state of the ladder.

Thereafter, as illustrated in FIGS. 6 and 7, when the ladder 13 in this state is attached to the storing bracket 14 provided on the bottom surface of the upper turning body 2, the ladder 13 can be stored and held without interfering with peripheral members.

As described above, in the crane according to the embodiment, the ladder 13 for getting on and off the workbench 12 of the upper turning body 2 has the support member 15 that is fixed to an upper portion side of the column 13a, the engagement member 16 that can be engaged with and disengaged from the locked portion 12b provided at the workbench 12, and the following mechanism that is interposed between the support member 15 and the engagement member 16. In a using state where the engagement groove 16a formed in the engagement member 16 is engaged with the locked portion 12b of the workbench 12, the engagement member 16 is rotated to follow downward movement of the locked portion 12b by the following mechanism when the upper turning body 2 sinks with work of mounting the counterweight 10. Therefore, the engagement groove 16a can be prevented from being lifted and coming off from the locked portion 12b.

In addition, in the embodiment, the following mechanism has the support shaft 18 (rotation fulcrum portion), which serves as a rotation center of the engagement member 16 and the support member 15, and the restricting part that restricts the rotation range of the engagement member 16. Since the restricting part is configured by the long hole 16b provided in the engagement member 16 and the pin 19 which is provided on the support member 15 and penetrates the long hole 16b, the following mechanism having a simple configuration can be realized. Moreover, the holding hole 16c is provided on an arc passing through the long hole 16b with the support shaft 18 of the engagement member 16 as a center, and the pin 19 is selectively insertable into the long hole 16b and the holding hole 16c. Therefore, when the ladder 13 is stored (when not being used), the pin 19 can be inserted into the holding hole 16c to decrease the protruding amount of the engagement member 16.

In addition, in the embodiment, since the support member 15 and the engagement member 16, which have the following mechanism described above, are attached to each of both of the columns 13a of the ladder 13, the following mechanisms on both of the right and left sides operate independently to cause each engagement member 16 to follow the sinking of the upper turning body 2 even in a case where a sinking amount of the upper turning body 2 is different on both of the right and left sides of the ladder 13.

The invention is not limited to the embodiment described above. It is possible to make various modifications without departing from the concept of the invention. All technical matters included in the technical idea described in the claims are the subject of the invention. Although the embodiment has been presented as a suitable example, those skilled in the art can realize, based on the content disclosed in the specification, a variety of alternative examples, correction examples, modification examples, or improvement examples, which are included in the technical scope described in the appended claims.

For example, although the support member 15 that is a separate body from the column 13a of the ladder 13 is used as a support portion that rotatably supports the engagement member 16 and the support member 15 is fixed to the column 13a by the attaching screw 17 in the embodiment, the engagement member 16 may be rotatably supported by a support portion provided integrally with the column 13a. That is, a part of the column 13a may configure the support portion.

In addition, although the support rod 12b provided on the tip end side of the workbench 12 is used as the locked portion in the embodiment, the locked portion may be a part other than the support rod 12b insofar as the part can hook the engagement member 16 of the ladder 13 to a rear end side of the upper turning body 2.

In addition, although the following mechanism in a form of rotating the engagement member 16 is adopted in the embodiment, without being limited thereto, the following mechanism may be a mechanism that can follow downward movement of the locked portion. For example, a mechanism that follows the downward movement of the locked portion as the engagement member moves along a following passage provided in the support portion may be adopted.

It should be understood that the invention is not limited to the above-described embodiment, but may be modified into various forms on the basis of the spirit of the invention. Additionally, the modifications are included in the scope of the invention.

What is claimed is:

1. A crane comprising:
   a lower traveling body;
   an upper turning body that is turnably provided on the lower traveling body;
   a counterweight that is mounted on the upper turning body; and
   a ladder for getting on and off the upper turning body, wherein the ladder has:
   an engagement member configured to engage with and disengage from an engaged portion provided at the upper turning body and a support portion that supports the engagement member; and
   a restricting part configured to restrict a rotation range of the engagement member, comprising a long hole provided in one side of the engagement member, and a pin provided at the support portion, the pin being inserted into the long hole to limit the rotation range, and
   a holding hole is provided on an arc passing through the long hole and having a center at a rotation fulcrum portion of the engagement member and the support portion, and the pin is selectively insertable into the long hole and the holding hole,
   such that, when the engaged portion in a state of being engaged with the engagement member is moved downward with work of mounting the counterweight, the engagement member rotates with respect to the support portion to follow downward movement of the engaged portion.

2. The crane according to claim 1, wherein when the pin is inserted into the holding hole, the engagement member is held in a stored state where a protruding amount from the ladder is smaller than when the engagement member is engaged with the engaged portion, and the pin is configured to hold the engagement member within the rotation range relative to the support portion, the rotation range being restricted by the restricting part.

3. The crane according to claim 2, wherein the ladder further includes a pair of columns and a plurality of steps that connect both of the columns to each other, and
   in the stored state, the engagement member has an avoiding portion that avoids an end portion of each of the steps protruding from each of the columns.

4. The crane according to claim 3, wherein the support portion is fixed on an upper end side of one of the columns using an attaching screw, and a semi-arc-shaped notch formed in a lower end of the support portion is fitted to an upper end portion of an uppermost step protruding from the column.

5. The crane according to claim 4, wherein a distance from the rotation fulcrum portion to the uppermost step and a distance from the rotation fulcrum portion to the avoiding portion of the engagement member are the same.

6. The crane according to claim 3, wherein the avoiding portion of the engagement member is semi-arc-shaped.

7. The crane according to claim 3, wherein the support portion is provided integrally with one of the columns.

8. The crane according to claim 1, wherein the engaged portion is a support rod that extends in a horizontal direction, and an engagement groove that allows the support rod to be inserted thereto from below is provided in the engagement member, and
   when the engaged portion is moved downward with the work of mounting the counterweight, the engagement member rotates with respect to the support portion such that one of inner side walls of the engagement groove facing each other enters a lower region where the support rod is projected from above.

9. The crane according to claim 8, wherein a workbench positioned at a place where the counterweight is attached is provided at a rear end portion of the upper turning body, and the support rod is provided on a tip end side of the workbench.

10. The crane according to claim 9, wherein the support rod is formed of a cylindrical pipe.

11. The crane according to claim 8, wherein the engagement groove has an inverted U-shape, and a dimension of the engagement groove on an open end side is larger than a diameter of the support rod.

12. The crane according to claim 1, wherein the ladder further includes a pair of columns, a plurality of steps that connect both of the columns to each other, an additional engagement member, an additional support portion, and an additional restricting part,
    the engagement members, the support portions, and the restricting parts are attached at opposing positions of the pair of columns, and
    when the engagement members are engaged with the engaged portion and the engaged portion is moved downward with the work of mounting the counterweight, each engagement member rotates independently with respect to each support portion to follow the downward movement of the engaged portion.

13. The crane according to claim 1, wherein the lower traveling body has a pair of right and left side frames on which crawlers are mounted on outer peripheries thereof and a car body connecting both of the side frames to each other, and
    the upper turning body is supported by the car body via a turning ring.

14. The crane according to claim 13, wherein a traveling device that includes a drive motor and a speed reducer is provided on one end side of the side frame in a front-and-rear direction, an idler is provided on the other end side thereof, and the crawlers are mounted on outer peripheries of the traveling device and the idler.

15. The crane according to claim 1, further comprising:
    a storing bracket for storing the ladder when not being used,
    wherein the storing bracket is provided on a bottom surface near a rear end portion of the upper turning body.

* * * * *